(12) United States Patent
Wan-Lung

(10) Patent No.: US 6,289,098 B1
(45) Date of Patent: Sep. 11, 2001

(54) MESSAGE GENERATOR WITH AUTO DIALER

(75) Inventor: Hsu Wan-Lung, Hsin-Chu (TW)

(73) Assignee: Utron Technology Inc., Hsin-Chu (TW)

( * ) Notice: Subject to any disclaimer, the term of this patent is extended or adjusted under 35 U.S.C. 154(b) by 0 days.

(21) Appl. No.: 09/618,242

(22) Filed: Jul. 18, 2000

Related U.S. Application Data

(63) Continuation-in-part of application No. 08/938,035, filed on Jul. 21, 1997, now abandoned.

(51) Int. Cl.[7] ................................................. H04M 1/26
(52) U.S. Cl. ................................. 379/357.03; 379/88.16
(58) Field of Search ........................ 379/67.1, 78, 88.16, 379/101.01, 355, 356, 397, 357.03

(56) References Cited

U.S. PATENT DOCUMENTS

| | | | |
|---|---|---|---|
| 4,817,135 | * | 3/1989 | Winebaum ............................ 379/355 |
| 5,469,491 | * | 11/1995 | Morley, Jr. et al. .................... 379/88 |
| 5,568,538 | * | 10/1996 | Tamir et al. ............................ 379/58 |
| 5,790,644 | * | 8/1998 | Kikinis ................................. 379/144 |

OTHER PUBLICATIONS

Mastering Windows 3.1 Special Edition, Robert Cooke, 1992, pp. 516–522.*

* cited by examiner

*Primary Examiner*—Scott L. Weaver
(74) *Attorney, Agent, or Firm*—Hung Chang Lin Patent Agent

(57) ABSTRACT

A message generation and automatic dialing system is used in conjunction with a telephone for a customer to receive product information and to place an order for the product or service. The product information such as product list and prices are prerecorded in a ROM and broadcast from a speaker, which is acoustically coupled to the telephone. The speaker then automatically generates dialing tones to connect the telephone to the customer service of the product company for the user to place an order of any product.

1 Claim, 1 Drawing Sheet

MESSAGE GENERATOR WITH AUTO DIALER

This is a continuation-in-part patent application of U.S. patent application Ser. No. 08/938,035 filed Jul. 21, 1997, now abandoned.

BACKGROUND OF THE INVENTION

This invention relates to a message generator with an automatic dialer for use with a telephone.

In the commercial and industrial world, the expense for advertisement is very high. The media for such advertisement include newspaper, magazines, television, radio, etc. The drawback of such advertisement is that the transmittal of messages is unilateral. If a customer desires further understanding of the message, he must jot down the message or the telephone number and call the company for more information

SUMMARY

An object of this invention is to provide a message generator of company product or service. Another object of this invention is to provide an automatic dialer for ordering any company product or service through a telephone.

These objects are achieved in this invention by using a message generator and an automatic dialer. The message generator provides prerecorded vocal sound or music for a customer to listen and to offer a selection of company product or services. The automatic dialer automatically transmits the selection and places an order through the transmitter of a telephone to the company customer service department.

DETAILED DESCRIPTION OF THE PREFERRED EMBODIMENT

The following example illustrates the practical application of the present invention. A company, say Pizza Hut, stores the prices of different variety pizzas and a toll-free telephone number in a memory of the message generator of the present invention. This message generator is distributed to any customer who patronizes a Pizza Hut. This message generator may also be distributed in any public places where there is a multitude of people. The message generator may also be given as a gift to any toy buyers.

Any customer who possesses such a generator can dial the keys of the message generator to obtain the prices of the Pizza Hut pizzas. When he decides to order any particular kind of pizza, he can find a telephone and place the message generator near the telephone transmitter. Then the telephone is activated and dialed to the customer service center to process the order.

Figure 1:
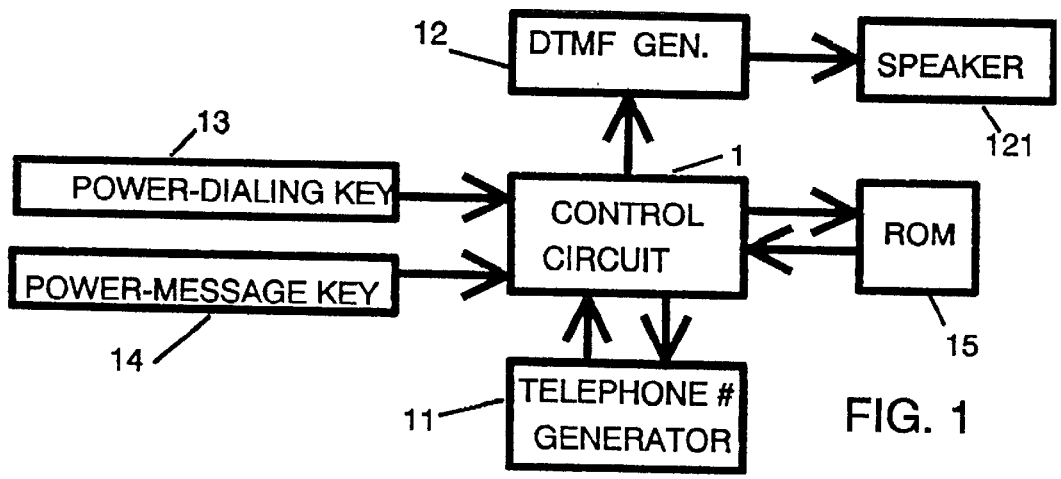
FIG. 1 shows the block diagram of the first embodiment of the present invention.

FIG. 1 shows one embodiment for implementing the present invention. A controller 1 controls a message generator and an automatic dialer. A READ-ONLY memory (ROM) 15 contains prerecorded information such as introduction of the company, prices, etc. The ROM 15 is controlled by the controller 1 to broadcast the message through a speaker 121. A telephone number generator 12 generates a series of different dual tone multiple frequency tones as controlled by the controller 1 and based on the telephone number generator 11. When the generated tone is placed near the transmitter of a telephone, the telephone is dialed. A power -dialing key 13 such as a micro-switch or an electronic switch is used to activate the controller so that the information stored in the ROM 15 is sent to the speaker 121. Another power-message key 14 such as a microswitch or an electronic switch is used to activated the controller so that the Dual Tone Multiple Frequency (DTMF) generator 12 generates tones according to the telephone number prerecorded in telephone number generator 11 and broadcasts through the speaker 121. The system has no provision for two-way transmission. The transmission is reproduced without analog-to-digital conversion.

Figure 2:
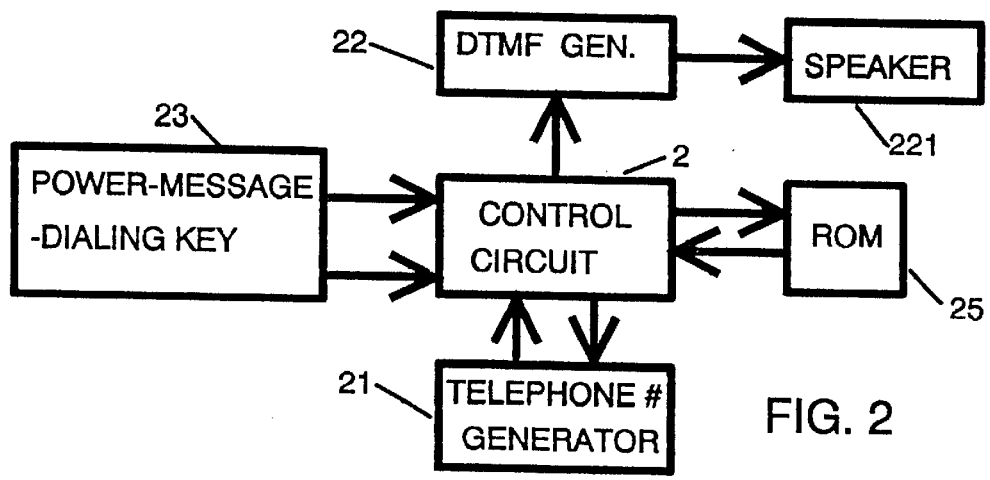
FIG. 2 shows the block diagram of a second embodiment of the present invention.

FIG. 2 shows a second embodiment of the present invention. In this embodiment, the power-dialing key 13 and the power-message key 14 in FIG. 1 are combined into a single power-message-dialing key 23 with similar function. A single control circuit 2 controls the message generation and telephone dialing functions. A READ-ONLY memory 25 contains prerecorded information such as brief introduction, prices, etc. The ROM 25 broadcast the prerecorded message through the speaker 221 as controlled by the control circuit 2. A telephone number generator 21 produces a series or multiple series of prerecorded telephone numbers. A Dual Tone Multiple Frequency (DTMF) generator 22 produces corresponding dialing tones as controlled by the control circuit 2. When the tones are placed near the transmitter of a telephone, the tones are inputted to the telephone for dialing. A power-message-dialing key 23 such as a microswitch or an electronic switch is used to activate the control circuit 2 for the information stored in the ROM 25 to be transmitted to and broadcast by the speaker 221. After the broadcast sound for a preset period of time, the system automatically activates the control circuit 2 so that the dialing tones generated by the DTMF generator 22 is transmitted to the speaker 221 for sound broadcasting. The tones from the DTMF generator correspond to the prerecorded telephone number generated in the telephone number generator 21.

In the message generator and auto dialer of the present invention, the stored telephone number generator 11 or 21 can be a single telephone number or a series of telephone numbers. When there is a series of telephone numbers, the telephone numbers are dialed in an order according to the number of times the key is depressed. For business promotion, the message is a dedicated message and the telephone number is a dedicated telephone number. Neither the message nor the telephone number can be changed by the user.

In this invention, the information can be a vocal sound, sound of animals, music or any sound, so long as the sound is prerecorded.

Figure 3:
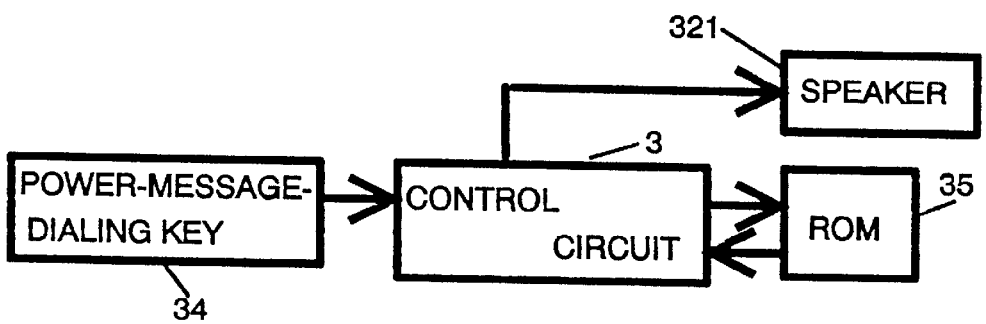
FIG. 3 shows the block diagram of a third embodiment of the present invention.

In addition, this invention can also be designed to store the tone in the memory. Under the control of the control circuit, the tone can be directly transferred to the speaker, as shown in FIG. 3. Thus, the telephone number generator is no longer needed.

In the embodiment shown in FIG. 3, the control circuit 3 controls the entire message generation and automatic dialing to implement specific function. A READ-ONLY memory 35 contains prerecorded information such as company brief introduction, prices, etc., and stores the tones of a series of telephone numbers. The ROM 35 transmits the prerecorded information to the speaker 321 as controlled by the control circuit 3. The tones of a telephone number are included in the stored information, e.g. at the beginning, at the end, or simultaneously at the beginning and the end. If a user does not desire to hear the company brief introduction, he can directly place the system near the transmitter of a telephone and to dial the telephone number. A power-message-dialing key 34, such as a micro-switch or an electronic switch may be used to activate the control circuit 3. Then, the information stored in the ROM 35 is broadcast from the speaker 321 as sound.

When the keys in the foregoing embodiments are depressed, the system power supply and functions are activated. Thus, it is not necessary to provide separate power supply switch. In addition, when the system finishes the broadcast function, the power supply is automatically cut off to conserve energy.

The forgoing description illustrates the preferred embodiments of this invention. Speakers are used as the sound reproducing device, but it should be understood that any other sound reproducing devices such as buzzers, resonators, etc. may also be used. This invention is by no means limited to these examples. Any equivalent techniques to implement the functions of this invention are all within the scope of this invention.

What is claimed is:

1. A business message generator and automatic dialing system for dialing a telephone, comprising a control circuit for controlling both said message generator and said automatic dialing system;

a read-only memory containing a dedicated prerecorded analog business promotion information to be outputted;

a dialing tone generator controlled by said control circuit to generate a dialing tone corresponding to a dedicated prerecorded telephone number for inputting to said telephone and dialing said telephone;

a sound reproducing means for one way broadcasting said prerecorded analog business promotion information and said dialing tone as an analog signal, said dialing tones being acoustically coupled to said telephone for dialing said telephone without provision for two-way transmission, wherein said prerecorded analog business promotion information and said prerecorded telephone number are fixed and cannot be altered by a user;

first means for activating said control circuit to transmit said analog business promotion information to said sound reproducing means without analog-to-digital conversion; and a second means for activating said control circuit to transmit said dialing tone without analog-to-digital conversion to said sound reproducing means.

* * * * *